US010363843B2

(12) United States Patent
Kawakami et al.

(10) Patent No.: US 10,363,843 B2
(45) Date of Patent: Jul. 30, 2019

(54) MULTIPURPOSE VEHICLE

(71) Applicant: YANMAR CO., LTD., Osaka-shi, Osaka (JP)

(72) Inventors: Tsuyoshi Kawakami, Osaka (JP); Masaaki Yamashita, Osaka (JP); Kiyoyuki Okuyama, Yamagata (JP)

(73) Assignee: YANMAR CO., LTD., Osaka ( * ) Notice: Subject to any disclaimer, the term of this patent is extended or adjusted under 35 U.S.C. 154(b) by 29 days.

(21) Appl. No.: 15/525,816

(22) PCT Filed: Oct. 30, 2015

(86) PCT No.: PCT/JP2015/080679
§ 371 (c)(1),
(2) Date: May 10, 2017

(87) PCT Pub. No.: WO2016/076141
PCT Pub. Date: May 19, 2016

(65) Prior Publication Data
US 2019/0152358 A1 May 23, 2019

(30) Foreign Application Priority Data

Nov. 14, 2014 (JP) .................................. 2014-232232
Nov. 14, 2014 (JP) .................................. 2014-232234

(51) Int. Cl.
*B60N 2/36* (2006.01)
*B60N 2/30* (2006.01)
(Continued)

(52) U.S. Cl.
CPC .............. *B60N 2/36* (2013.01); *B60N 2/3013* (2013.01); *B60N 2/3045* (2013.01); *B60P 3/40* (2013.01);
(Continued)

(58) Field of Classification Search
CPC ...... B60N 2/36; B60N 2/3013; B60N 2/3045; B62D 33/02; B62D 47/003; B60P 3/10; B60R 7/043
See application file for complete search history.

(56) References Cited

U.S. PATENT DOCUMENTS 6,478,355 B1   11/2002  Van Eden et al.
8,196,990 B2 *  6/2012  Aebker .................... B60N 2/36
                                                      296/69
(Continued)

FOREIGN PATENT DOCUMENTS

JP   S57067835 U1   4/1982
JP   S5836930 U1    3/1983
(Continued)

OTHER PUBLICATIONS

International Search Report corresponding to Application No. PCT/JP2015/080679; dated Jan. 19, 2016.
(Continued)

Primary Examiner — D Glenn Dayoan
Assistant Examiner — Melissa A Black
(74) Attorney, Agent, or Firm — Norton Rose Fulbright US LLP

(57) ABSTRACT

For loading space extending from a carriage to a driving section in a multipurpose vehicle with a driving section and a carriage disposed to the rear of the driving section fitted with a driver seat and a passenger seat laterally: the passenger seat has a seat portion and a backrest portion forwardly rotatable about a fulcrum provided by each of a front lower portion and a lower portion; a front gate board disposed on a front end of a floor board constituting the carriage is configured such that a movable front gate board positioned rearward of the passenger seat is forwardly rotatable; and the seat portion and the backrest portion rotated forward, the
(Continued)

movable front gate board rotatable and to place over the backrest portion for an extended loading space.

7 Claims, 20 Drawing Sheets

(51) Int. Cl.
  *B62D 33/02* (2006.01)
  *B60P 3/40* (2006.01)
  *B60R 7/04* (2006.01)
  *B62D 47/00* (2006.01)
(52) U.S. Cl.
  CPC .............. *B62D 33/02* (2013.01); *B60R 7/043* (2013.01); *B62D 47/003* (2013.01)

(56) References Cited

U.S. PATENT DOCUMENTS

| | | | |
|---|---|---|---|
| 2008/0308334 A1* | 12/2008 | Leonard | B60K 37/00 180/89.1 |
| 2009/0184536 A1* | 7/2009 | Kubota | B60N 2/3013 296/65.09 |

FOREIGN PATENT DOCUMENTS

| | | |
|---|---|---|
| JP | S58157749 U | 10/1983 |
| JP | S62043033 U1 | 3/1987 |
| JP | S62150947 U1 | 9/1987 |
| JP | S64045558 U | 3/1989 |
| JP | H11314581 A | 11/1999 |
| JP | 2005082002 A | 3/2005 |
| JP | 2007522006 A | 8/2007 |
| JP | 2009255861 A | 11/2009 |
| JP | 2009292407 | 12/2009 |
| JP | 2010095107 A | 4/2010 |
| JP | 2011116224 A | 6/2011 |
| JP | 2013052035 A | 3/2013 |

OTHER PUBLICATIONS

JP Notification of Reasons for Refusal corresponding to Application No. 2014-232232; dated Jan. 9, 2018.
JP Notification of Reasons for Refusal corresponding to Application No. 2014-232234; dated Jan. 23, 2018.

* cited by examiner

US 10,363,843 B2

MULTIPURPOSE VEHICLE

CROSS REFERENCE TO RELATED APPLICATIONS

This is the U.S. national stage of application No. PCT/JP2015/080679, filed on Oct. 30, 2015. Priority under 35 U.S.C. § 119(a) and 35 U.S.C. § 365(b) is claimed from Japanese Application No. 2014-232232, filed Nov. 14, 2014, and Japanese Application No. 2014-232234, filed Nov. 14, 2014, the disclosure of which is also incorporated herein by reference.

TECHNICAL FIELD

The present invention relates to a multipurpose vehicle, and more specifically relates to a seat structure of a multipurpose vehicle with which a long object longer than a carriage can be carried.

BACKGROUND ART

Conventionally, a multipurpose vehicle including a driving section and a carriage disposed behind the driving section has been known. One example of such a multipurpose vehicle includes a utility vehicle as a multipurpose vehicle disclosed in Patent Literature 1. The multipurpose vehicle described in Patent Literature 1 carries a long object that protrudes beyond the carriage, with the long object placed and secured while protruding beyond a rear end of the carriage. A transmission case, an air cleaner for filtering intake air to an engine on one side of the transmission case, and a fuel tank on the other side of the transmission case, are disposed below a seat in the driving section. An article storage section is formed below the driver seat and a seat for a fellow passenger.

CITATION LIST

Patent Literature

PTL 1: Japanese Unexamined Patent Application Publication No. 2010-95107

SUMMARY OF INVENTION

Technical Problem

As described above, such a long object is placed on the conventional multipurpose vehicle with the rear end of the long object protruding rearward beyond a vehicle body. Thus, the rear end of the long object might be damaged by colliding with an obstacle or the like, when the vehicle makes a turn on a narrow road. In this configuration, a long object formed of a soft material deforms when being carried with a front portion inclined downward and a rear portion placed on the rear gate in this configuration. Furthermore, a long object short in the left and right direction is likely to be displaced in the left and right direction and might be unable to be stably carried. The article storage section below the seat are divided into left and right portions and has a low height, and thus can accommodate items with a short entire length and with a low height.

In view of the above, an object of the present invention is to provide a multipurpose vehicle in which a loading space extending can be formed over a carriage and a driving section and a large space can be formed below seats.

Solution to Problem

Next, a solution to the problem described above to be solved by the present invention is described.

A multipurpose vehicle according to the present invention includes: a driving section; and a carriage disposed behind the driving section. The driving section includes: a driver seat; and a passenger seat disposed side by side with the driver seat. The passenger seat includes a seat portion and a backrest portion. The seat portion is forwardly pivotable about a front lower portion. The backrest portion is forwardly pivotable about a lower portion. A front gate board stands on a front end of a floor board forming the carriage and includes a movable front gate board that is positioned behind the passenger seat and is forwardly pivotable. An extended loading space is formed with the seat portion and the backrest portion of the passenger seat pivoted forward and the movable front gate board pivoted to be placed over the backrest portion. A step portion is formed on a back surface of the backrest portion. When the backrest portion forwardly pivots to be in a horizontal state, and an upper surface of the movable front gate board and the back surface of the backrest portion are flush with each other. A lock mechanism that is able to maintain a horizontal direction position and a vertical direction position is provided near the backrest portion.

In the present invention, rear corner members may be provided in upper portions of left and right rear supporting columns and a rear middle supporting column standing upward from a rear bearing frame laterally disposed on a vehicle frame behind the driver seat and the passenger seat. A roof rack including a bracket and a rack bar may be attached to the corner members. In the present invention, a ROPS frame may include: the left and right rear supporting columns and the rear middle supporting column; left and right front supporting columns; left and right upper frames; front and rear lateral frames; and a reinforcement frame. Curved portions bulging rearward may be formed in upper portions of the rear supporting columns and the rear middle supporting column. The curved portions may surround a periphery of a rear upper portion of a head of a driver seated on the driver seat while being separated from the head by a predetermined distance.

In the present invention, rear working lamps may be provided to the corner members.

In the present invention, a rack bar may be inserted to be secured in a fitting portion opened in the bracket.

A multipurpose vehicle according to the present invention includes: a driving section; and a carriage disposed behind the driving section. The driving section includes: a driver seat and a passenger seat disposed side by side with the driver seat. The passenger seat includes a seat portion and a backrest portion. The seat portion is forwardly pivotable about a front lower portion. The backrest portion is forwardly pivotable about a lower portion. A front gate board stands on a front end of a floor board forming the carriage and includes a movable front gate board that is positioned behind the passenger seat and is forwardly pivotable. An extended loading space is formed with the seat portion and the backrest portion of the passenger seat pivoted forward and the movable front gate board pivoted to be placed over the backrest portion. A step portion is formed on a back surface of the backrest portion. When the backrest portion forwardly pivots to be in a horizontal state, the movable front gate board forwardly pivoted fits in the step portion, and an upper surface of the movable front gate board and the back surface of the backrest portion are flush with each other. Protruded portions extending in a front and rear direction are formed on the back surface of the backrest portion of the passenger seat. The protruded portions are provided with handgrips.

In the present invention, a storage space continuously extending in a left and right direction may be disposed below the driver seat and below the passenger seat. The storage space may be able to be opened by lifting a seat portion of at least one of the driver seat and the passenger seat. The storage space may be able to be opened by opening a side cover provided to a side portion of a seat portion of at least one of the driver seat and the passenger seat.

In the present invention, a drawer capable of being pulled forward may be provided in the storage space below the driver seat and the passenger seat.

Advantageous Effects of Invention

The present invention can provide the following effects. Specifically, the extended loading space can be formed with a simple operation and with the carriage and the passenger seat having relatively simple configurations. Thus, a long object that protrudes beyond the carriage can be loaded in a substantially horizontal state.

A storage space with a large capacity can be ensured below the driver seat and the passenger seat. The storage space can be formed as a large continuous space formed below the passenger seat and below the driver seat, and thus can accommodate a long object with a long lateral width.

DESCRIPTION OF EMBODIMENTS

Figure 1:
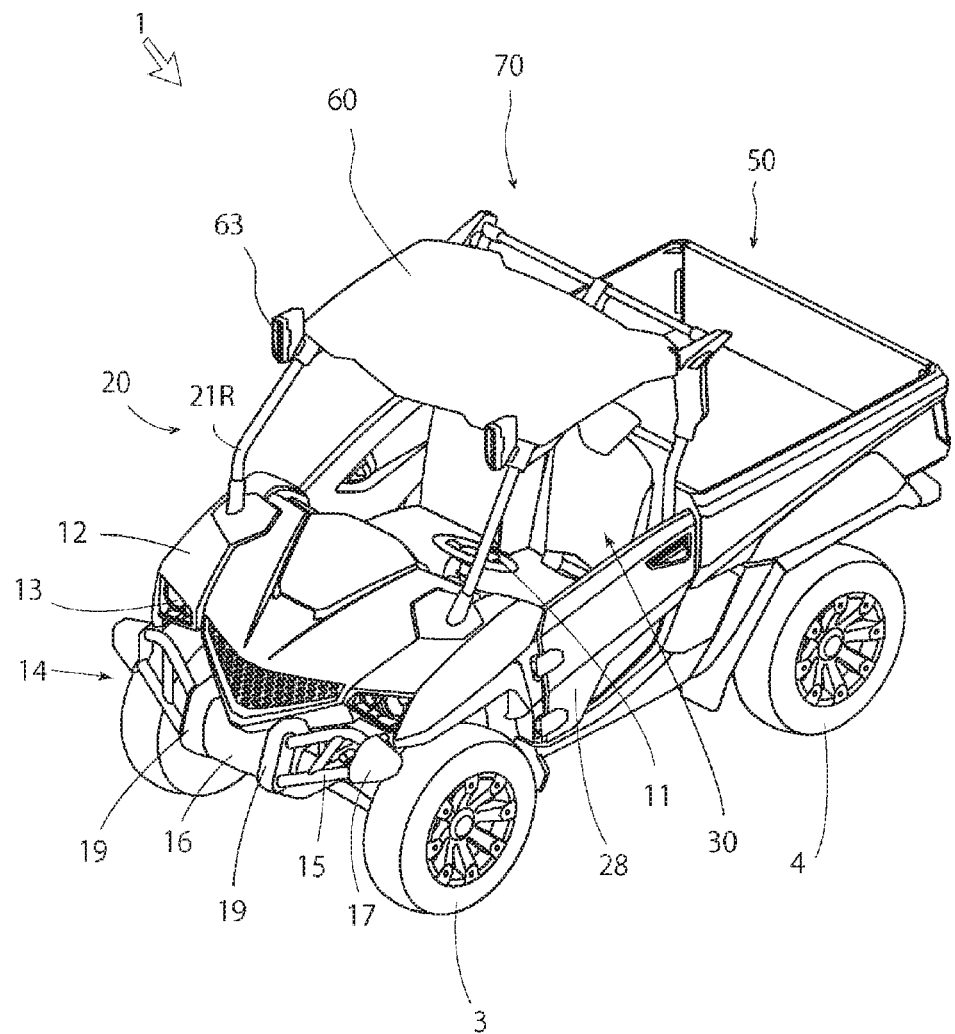
FIG. 1 is a perspective view illustrating an overall configuration of a multipurpose vehicle according to an embodiment of the present invention.

Next, an embodiment of the present invention is described with reference to the attached drawings.

First of all, an overall configuration of a multipurpose vehicle (utility vehicle, "UTV") 1 as the embodiment of the present invention is described with a direction F defined as a forward side.

As illustrated in FIG. 1 to FIG. 4, the multipurpose vehicle 1 includes: a driving section 10 disposed on a front portion of a vehicle frame 2; and a carriage 50 disposed on a rear portion of the vehicle frame 2. A traveling unit is formed with a pair of left and right front wheels 3 and 3 as wheels for steering supported on a front lower portion of the vehicle frame 2 and a pair of left and right rear wheels 4 and 4 supported on a rear lower portion of the vehicle frame 2. An engine 5, a fuel tank 6, a transmission case 7, and a battery 8, as a power source, are provided on a rear side of the vehicle frame 2 and below the carriage 50 (see FIG. 4).

The engine 5 is disposed below the center of the carriage 50 in the left and right direction. The fuel tank 6 is disposed in an empty space on the right side of the engine 5, and the battery 8 is disposed in an empty space on the left side of the engine 5. The fuel tank 6 and the battery 8 are disposed within the width of the carriage 50. The transmission case 7 and a rear axle case are disposed behind the engine 5. A front axle case and a steering mechanism are disposed in a hood 12 on the front side of the driving section 10. The front wheels 3 and 3 and the rear wheels 4 and 4 are supported by the vehicle frame 2 via independent suspension mechanisms.

Driving force from the engine 5 can be shifted by a transmission device in the transmission case 7, transmitted to the rear wheels 4 and 4 via a transmission mechanism in the rear axle case, and transmitted from the transmission case 7 to the front wheels 3 and 3 via a transmission shaft and the transmission mechanism in the front axle case.

Figure 4:
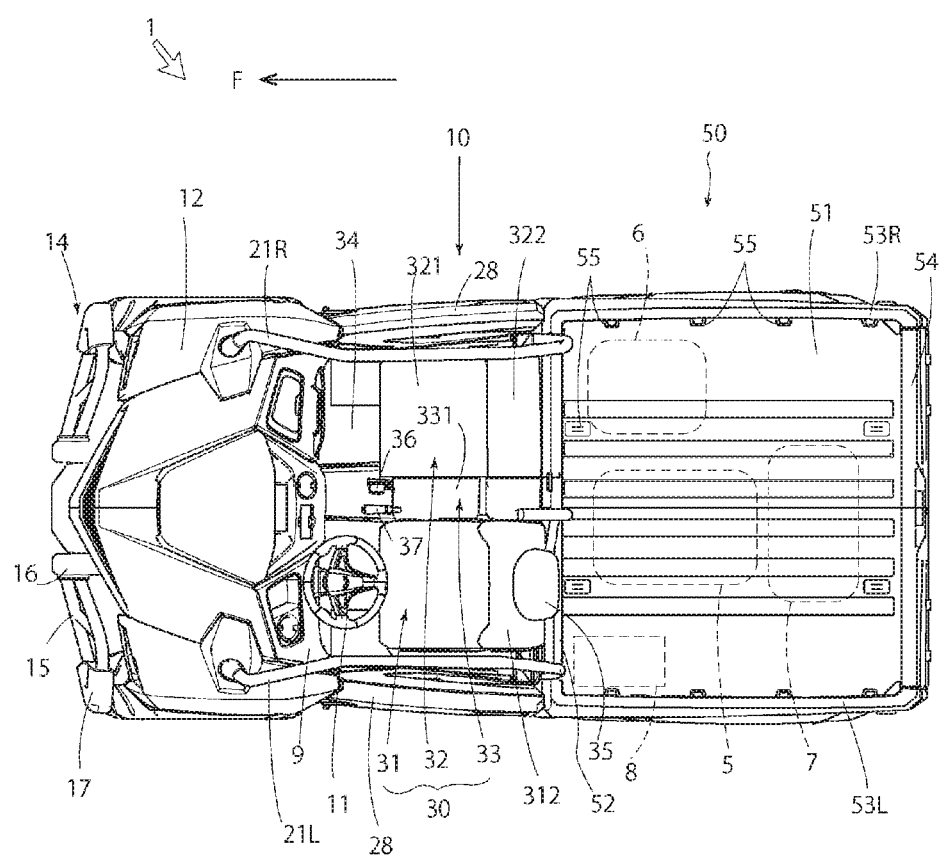
FIG. 4 is a plan view of the multipurpose vehicle in a state with a roof removed.
Figure 5:
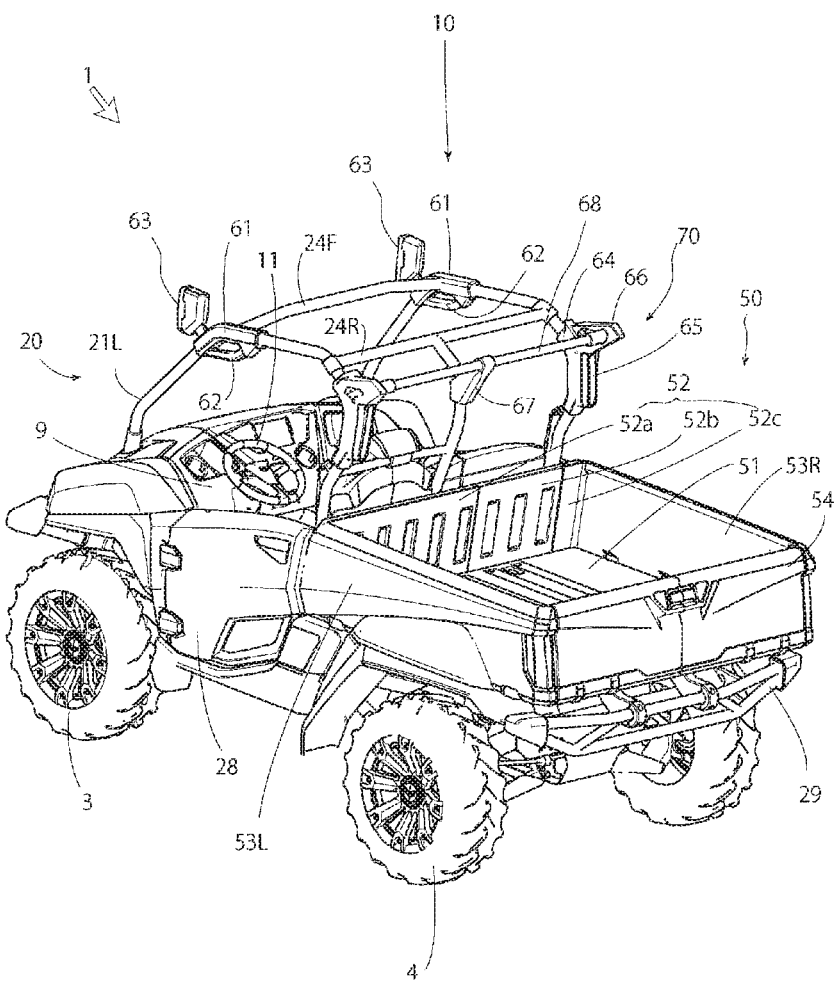
FIG. 5 is a rear perspective view of the multipurpose vehicle in a state with the roof removed.
Figure 8:
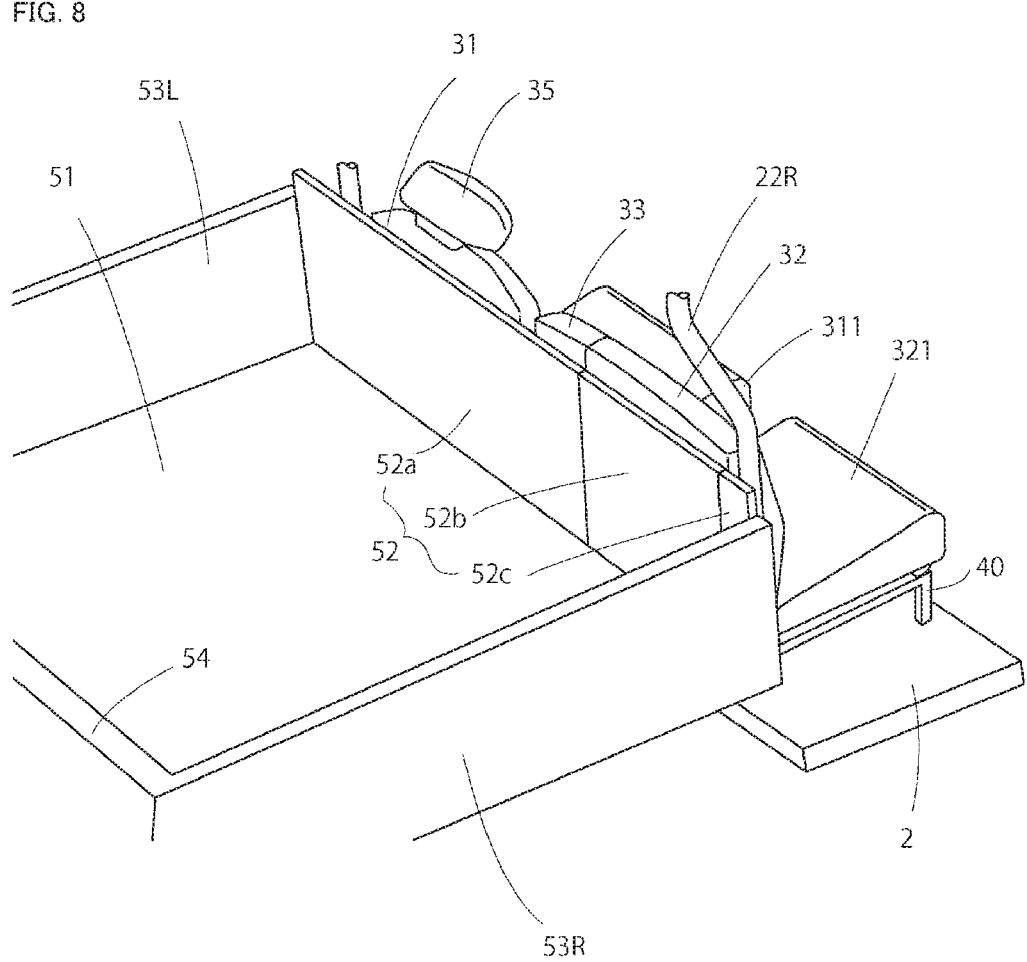
FIG. 8 is a schematic rear perspective view of a carriage.

As illustrated in FIG. 4, FIG. 5, and FIG. 8, the carriage 50 includes a floor board 51, a front gate board 52, left and right gate boards 53L and 53R, and a rear gate board 54. Hooks 55, 55 . . . are arranged on the circumference of the floor board 51 with appropriate distances in between, so that a rope can be fastened. Alternatively, the hooks 55 can be provided to the front gate board 52, the left and right gate boards 53L and 53R, and the rear gate board 54.

The floor board 51 has a rear lower portion pivotally supported by the vehicle frame 2 with an axis extending in a left and right direction. An unillustrated hydraulic cylinder is disposed between the vehicle frame 2 and a lower surface of the floor board 51. The front portion of the carriage 50 can be lifted and lowered through telescopic movement of the hydraulic cylinder. However, this should not be construed in a limited sense, and an electric cylinder may be used instead of the hydraulic cylinder to achieve the lifting and lowering. A rear bumper 29 extending in the left and right direction protrudes toward a rear lower side from a lower surface of the rear portion of the floor board 51. Alternatively, the rear bumper 29 may extend from the vehicle frame 2.

The front gate board 52 is divided at portions behind a passenger seat 32 described below to have fixed front gate boards 52a and 52c and a movable front gate board 52b. The fixed front gate board 52a stands from a front end of the floor board 51 while extending over a wider area in a width direction on the side of a driver seat 31. The fixed front gate board 52c is disposed behind a rear supporting column 22R of a ROPS frame 20 described below, is wider than the rear supporting column 22R, and stands from a right front end of the floor board 51. The movable front gate board 52b is disposed between the fixed front gate boards 52a and 52c and behind a backrest portion 322 of the passenger seat 32, and has a lower end supported on a front end of the floor board 51 in such a manner as to be forwardly pivotable. The movable front gate board 52b has a left and right width that is substantially the same as or shorter than a left and right width of the backrest portion 322 of the passenger seat 32, and is attached while being aligned in the left and right direction. Both left and right sides of an upper portion of the movable front gate board 52b can be fixed to the fixed front gate boards 52a and 52c via an unillustrated lock member.

The left and right gate boards 53L and 53R have lower end sides pivotally supported on both left and right sides of the floor board 51, in such a manner as to be pivotable toward outer sides. Unillustrated securing portions for achieving securing to the fixed front gate boards 52a and 52c are formed on front ends of the gate boards 53L and 53R. The rear gate board 54 has a lower end side pivotally supported on a side of the floor board 51 on the rear side, in such a manner as to be pivotable toward the rear side. An unillustrated securing portion for achieving securing to rear portions of the gate boards 53L and 53R is formed on an upper end of the rear gate board 54. Alternatively, the rear gate board 54 may have an upper portion pivotally supported to have a lower side opened when dumping the carriage 50.

As described above, the carriage 50 has a luggage room with an upper side opened, defined with a floor board 51, the front gate board 52, the left and right gate boards 53L and 53R, and the rear gate board 54. The room can be opened with the rear gate board 54 pivoted outward. As described later, a long object can be loaded on an extended loading space S obtained by increasing a luggage room space toward the forward side with the movable front gate board 52b as well as a seat portion 321 and the backrest portion 322 of the passenger seat 32 reclined forward.

The driving section 10 includes a steering wheel 11, the ROPS frame 20, and a seat 30. A space inside the driving section 10 can be accessed with left and right doors 28 and 28 opened. The hood 12 accommodating a steering device is disposed on the front side of the driving section 10, and headlights 13 and 13 are disposed on left and right front portions of the hood 12. A front bumper 14 is disposed on a front end of the vehicle frame 2 on the front side of the hood 12.

Figure 3:
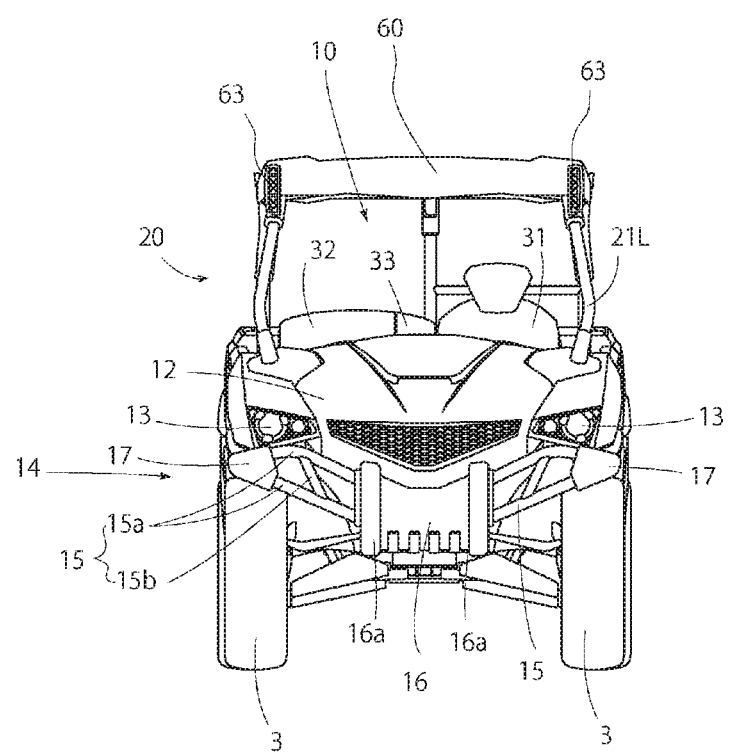
FIG. 3 is a front view of the multipurpose vehicle.

As illustrated in FIG. 1 and FIG. 3, the front bumper 14 includes pipe frames 15, a front guard 16, and side guards 17 and 17. The pipe frames 15 include two sets of upper and lower main pipes 15a and 15a and a reinforcement pipe 15b disposed on left and right sides. The main pipes 15a and 15a extends diagonally upward from the front guard 16 each disposed at the center in the left and right direction toward the left and right sides to be secured to the side guards 17. The reinforcement pipes 15b each extend upward toward the side to be coupled and secured to the center of a portion between the upper and lower main pipes 15a and 15a in the left and right direction.

Figure 20:
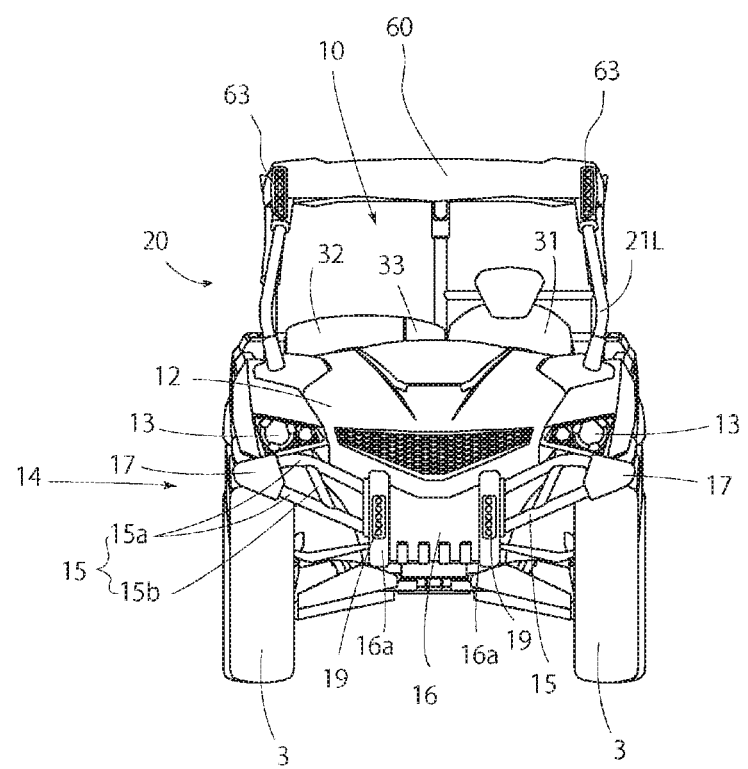
FIG. 20 is a front view of a multipurpose vehicle according to another embodiment.

The front guard 16 is disposed at the center of a front portion of the hood 12 in the left and right direction. Block portions 16a and 16a are formed on both left and right sides of the front guard 16. A winch is disposed between the left and right block portions 16a and 16a. The upper and lower main pipes 15a and 15a extend from both left and right side portions of the left and right block portions 16a and 16a. The left and right block portions 16a and 16a each have a front end partially protruding forward beyond the main pipes 15a and 15a and the winch 18. As illustrated in FIG. 20, a front light 19 can be disposed at the center of each of the left and right block portions 16a. The front light 19 is embedded in the block portion 16a so as not to receive a direct impact, is formed of an LED and the like, and has a vertically extending shape. The front light 19 is not particularly limited and may be a working lamp or a fog lamp.

As illustrated in FIG. 4, a dashboard 9 is provided on a rear portion of the hood 12. The steering wheel 11 protrudes upward from a left side portion of the dashboard 9. Alternatively, the steering wheel 11 may be formed on a right side portion.

Figure 6:
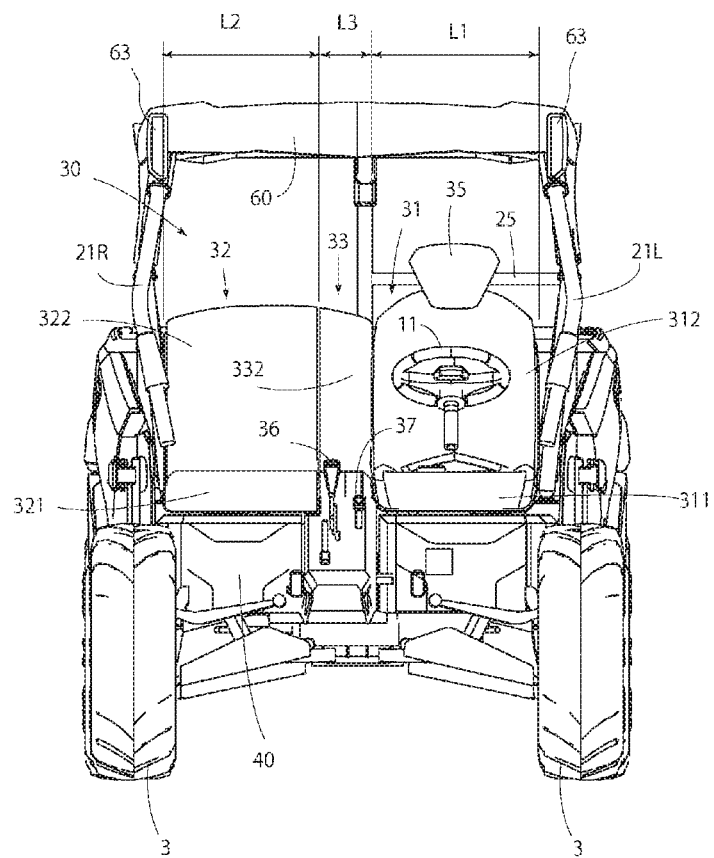
FIG. 6 is a front view of a driving section.
Figure 7:
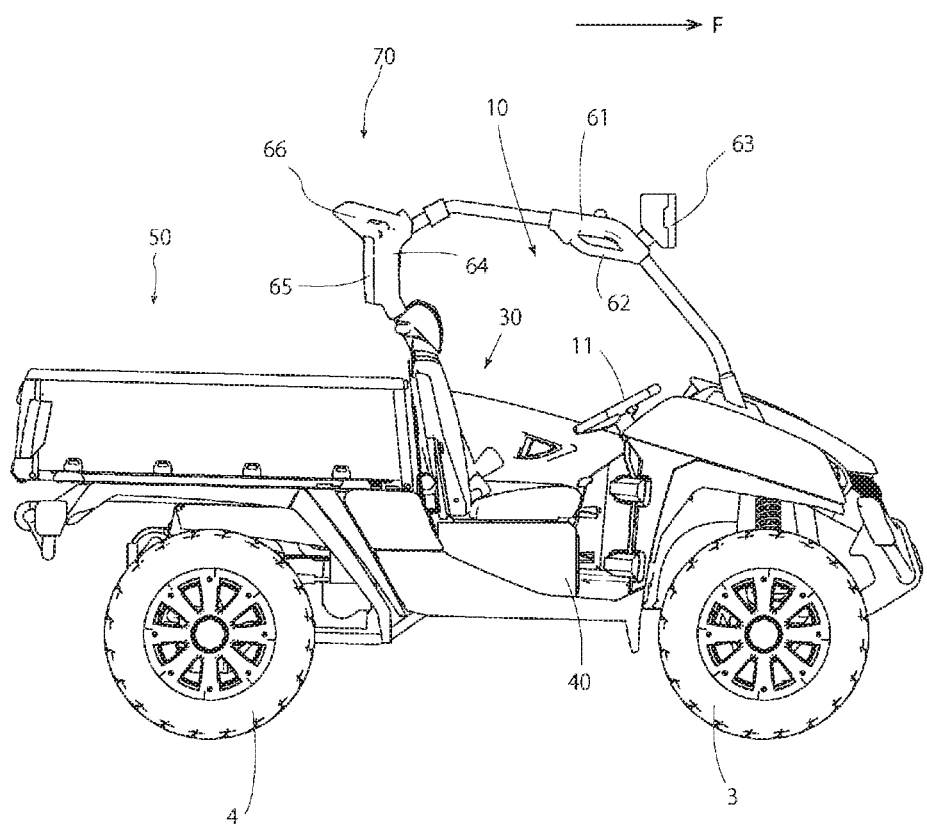
FIG. 7 is a side view of the multipurpose vehicle in a state with the roof and doors removed.

As illustrated in FIG. 4, FIG. 6, and FIG. 7, the seat 30 is disposed on a floor 34 behind the dashboard 9. The seat 30 includes the driver seat 31, the passenger seat 32, and an auxiliary seat 33. The driver seat 31, the passenger seat 32, and the auxiliary seat 33 are attached on a seat frame 40.

The driver seat 31 is disposed on the rear side of the steering wheel 11 and is disposed on the left side in this embodiment, with the passenger seat 32 disposed on the right side. The driver seat 31 has a left and right width L1 that is substantially the same as a left and right width L2 of the passenger seat 32 (L1≈L2), and the widths are set to be about the same as a width across the shoulders of a person. The auxiliary seat 33 is disposed between the driver seat 31 and the passenger seat 32. The auxiliary seat 33 has a left and right width L3 set to be shorter than the width of the driver seat 31 or the seat 30 (L1 or L2>L3). More specifically, a ratio of the left and right width between the driver seat 31 and the passenger seat 32 and the auxiliary seat 33 is set to be L1 or L2:L3=(2 to 4):1.

As illustrated in FIG. 6 to FIG. 11, the driver seat 31 has a seat portion 311 and a backrest portion 312 integrally formed and is fixed on the seat frame 40. Alternatively, the seat portion 311 and the backrest portion 312 may be separately formed with the seat portion 311 or the backrest portion 312 being forwardly pivotable. A headrest 35 is disposed on the upper side of the backrest portion 312 of the driver seat 31 and is attached to a reinforcement frame 25 of the ROPS frame 20 described later.

The passenger seat 32 includes the seat portion 321 and the backrest portion 322. The seat portion 321 has a front lower portion pivotally supported by the seat frame 40 via the supporting shaft 321a to be upwardly and forwardly pivotable. The backrest portion 322 has a lower portion pivotally supported by the vehicle frame 2 via a supporting shaft 322a to be forwardly pivotable, so that an upper surface of the seat frame 40 can be opened. With a lock mechanism provided near the supporting shaft 321a, a horizontal direction position and a vertical direction position of the seat portion 321 can be maintained. With a lock mechanism provided near the supporting shaft 322a, a vertical direction position and a horizontal direction position can be maintained. Thus, the seat portion 321 can be maintained at a vertical posture with the lock mechanism, after forwardly pivoting about the supporting shaft 321a. The backrest portion 322 can be locked at a horizontal posture after being forwardly and downwardly pivoted about the supporting shaft 322a, in a state where the seat portion 321 has been pivoted forward. Alternatively, the headrest 35 may be detachably attached to an upper portion of the backrest portion 322.

Figure 10:
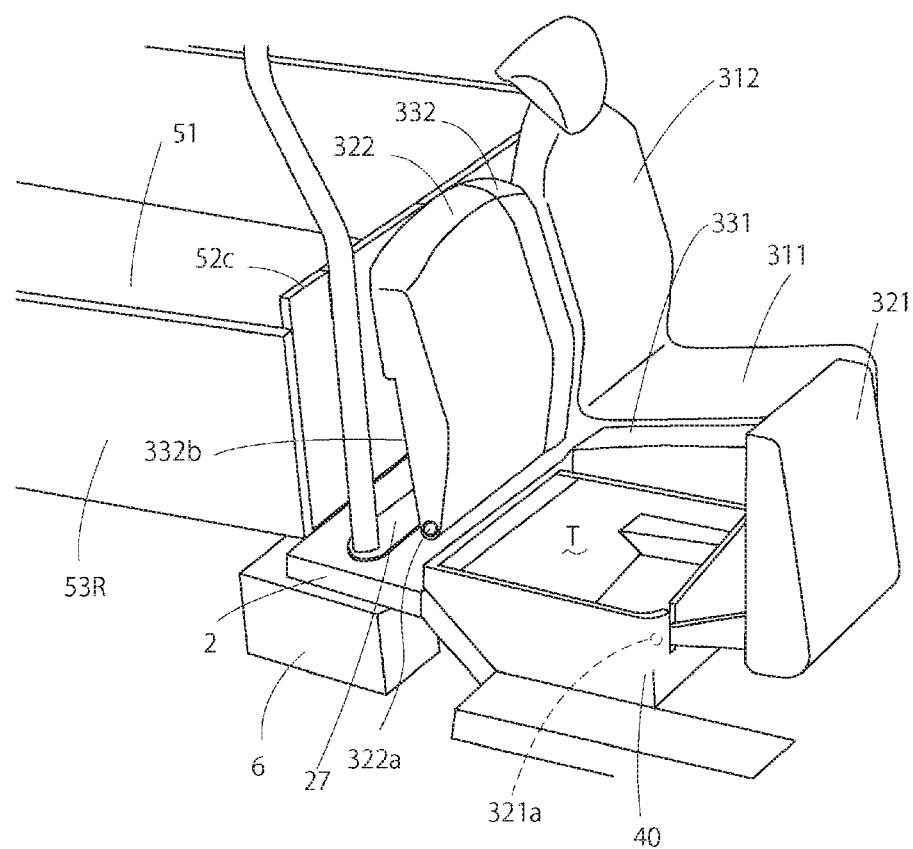
FIG. 10 is a perspective view of the driving section in a state where a seat portion of a passenger seat is reclined forward.
Figure 11:
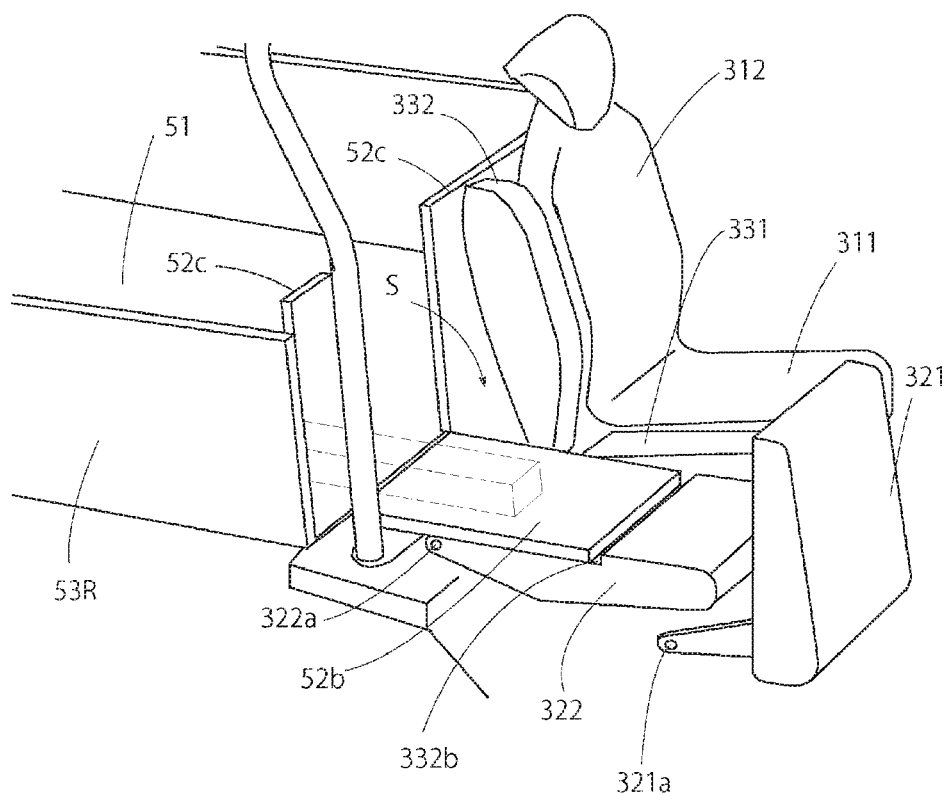
FIG. 11 is a perspective view of the driving section in a state where the seat portion of the passenger seat is reclined forward and a backrest portion and a movable front gate board are reclined.
Figure 12:
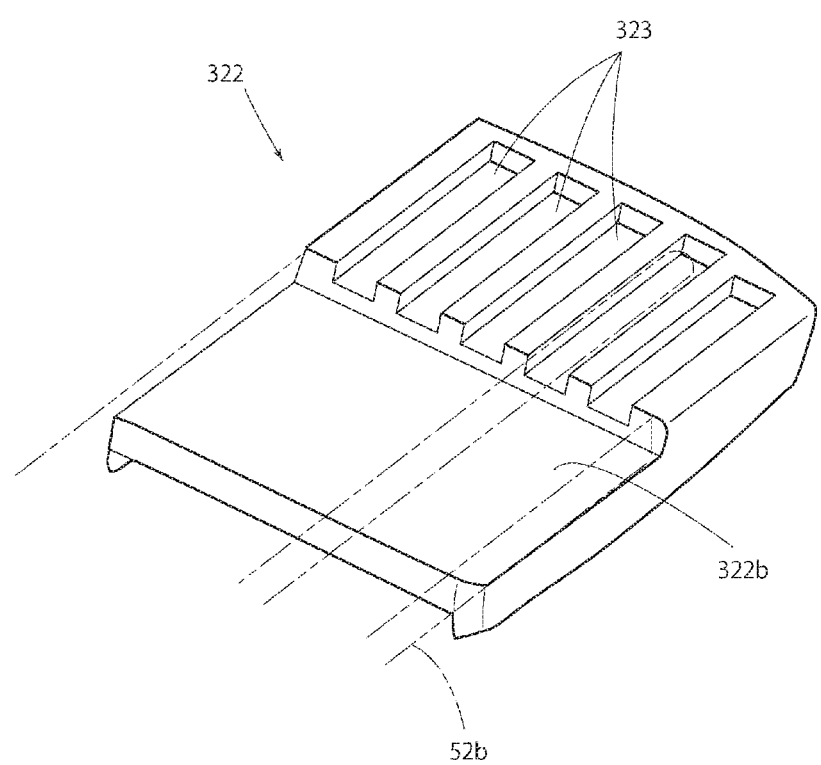
FIG. 12 is a perspective view illustrating another embodiment in a state where the backrest portion of the passenger seat and the movable front gate board are reclined.

As illustrated in FIG. 10, FIG. 11, and FIG. 12, a step portion 322b where a width in the front and rear direction is reduced is formed at a lower portion of a back surface (rear surface) of the backrest portion 322. The movable front gate board 52b of the carriage 50 that is reclined forward fits in the step portion 322b. Thus, the height of the step portion 322b is set to match the thickness of the movable front gate board 52b. Thus, when the movable front gate board 52b is fitted in the step portion 322b, the upper surface of the movable front gate board 52b, the front upper surface of the backrest portion 322, and the upper surface of the floor board 51 are at substantially the same height, and thus there is no step formed as illustrated in FIG. 11.

A plurality of grooves 323 are formed on an upper portion of the back surface of the backrest portion 322 as illustrated in FIG. 12. The grooves 323 have a groove form with a longitudinal direction extending along the front and rear direction when the backrest portion 322 is at the horizontal posture. Thus, a long object in a form of a rod, a pipe, and the like can be fitted in the groove 323 so as not to roll to be displaced. Grooves are also formed on the surface of the floor board 51 and the back surface of the movable front gate board 52b and the grooves 323 are formed as an extension of these grooves.

Figure 13:
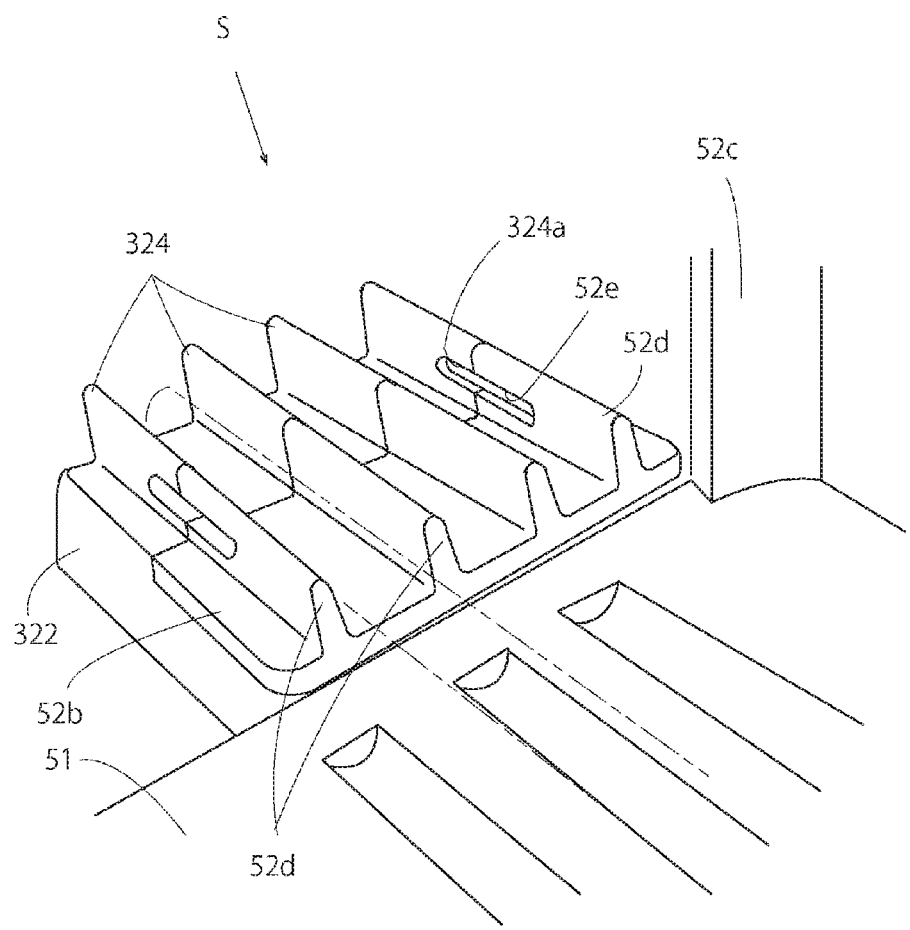
FIG. 13 is a perspective view of the backrest portion of the passenger seat.

As illustrated in FIG. 13, a plurality of protruded portions 324 extending in the front and rear direction may be formed instead of the grooves 323. In this configuration, protruded portions 52d, as an extension of the protruded portions 324, may be formed on the movable front gate board 52b. Handgrips 324a and 52e may be formed on the protruded portions 324 and the protruded portions 52d so that a tilting operation of the backrest portion 322 and the movable front gate board 52b can be easily performed. The groove 323 and the protruded portion 324 are not limited to semicircular, triangular, and quadrangular cross-sectional shapes. The width and the height of the groove are not limited. Thus, a plurality of types of protrusions and recesses with different widths and heights may be formed. With the plurality of types of protrusions and recesses formed, long objects with different diameters and widths can be stably held.

As illustrated FIG. 4 and FIG. 6, the auxiliary seat 33 has a width narrower than those of the driver seat 31 and the passenger seat 32, and is disposed to fill the space between the driver seat 31 and the passenger seat 32. The auxiliary seat 33 includes a seat portion 331 and a backrest portion 332. An upper surface of the seat portion 332 and upper surfaces the seat portions 311 and 321 of the driver seat 31 and the passenger seat 32 are set to be flush with each other so that no step is formed. A front surface of the backrest portion 332 and front surfaces of the backrest portions 312 and 322 of the driver seat 31 and the passenger seat 32 are set to be flush with each other so that no step is formed. Thus, the movement in the left and right direction between the driver seat 31 and the passenger seat 32 can be easily achieved.

The seat portion 331 has as front end surface disposed more on the rear side than the front end surfaces of the seat portions 311 and 321 of the driver seat 31 and the passenger seat 32. Thus, operation levers such as a transmission lever 36 and a side brake lever 37 can be disposed in a recessed space defined by the seat portions 311 and 321 and the seat portion 331. The seat portion 331 and the backrest portion 332 are integrally formed and are fixed to the seat frame 40.

Alternatively, the seat portion 331 and the backrest portion 332 may be separately formed, and the seat portion 331 may be pivotally supported by the seat frame 40, to be capable of being pivoted upward so that the upper surface of the seat frame 40 can be opened.

The backrest portion 332 is configured to form an integrated shape with the backrest portion 322 of the passenger seat 32 in the vertical posture to achieve a favorable design. Alternatively, the backrest portion 332 can be configured to be capable of reclining forward and maintained at the horizontal posture above the seat portion 331, so that the backrest portion 332 can serve as an armrest. The backrest portion 332 may have the back surface recessed in a cylindrical form so that a cup holder can be provided in the recess. In this configuration, with the backrest portion 332 reclined forward, a cup, a PET bottle, and the like can be stably held in the recess and easily picked up without hindering the driving.

With the seat 30 having the configuration described above, a long object slightly longer than the length of the carriage 50 in the front and rear direction is loaded as follows. First of all, as illustrated in FIG. 10, the seat portion 321 of the passenger seat 32 is pivoted forward about the supporting shaft 321a and is maintained at the vertical posture. Then, as illustrated in FIG. 11, the backrest portion 322 is pivoted about the supporting shaft 322a to be reclined forward, and the movable front gate board 52b of the carriage 50 is reclined forward. Thus, the extended loading space S can be formed at the position of the passenger seat 32. In this state, the auxiliary seat 33 is maintained at the same posture as the driver seat 31, and thus the operation space of the driver seated on the driver seat 31 can be ensured. Without the auxiliary seat 33, a larger extended loading space S can be formed with the backrest portion 322 of the passenger seat 32 reclined forward. However, when this extended loading space S is fully loaded, luggage is disposed close the driver seat 31 to hinder the driving and make the driver feel cramped. Thus, the auxiliary seat 33 is provided as in this embodiment, so that the operation space can be ensured for the driver seat 31.

As described above, the multipurpose vehicle 1 includes: the driving section 10; and the carriage 50 disposed behind the driving section 10. The driving section 10 includes: the driver seat 31; and the passenger seat 32 disposed side by side with the driver seat 31. The passenger seat 32 includes the seat portion 321 and the backrest portion 322. The seat portion 321 is forwardly pivotable about the front lower portion. The backrest portion 322 is forwardly pivotable about the lower portion. The front gate board 52 stands on the front end of the floor board 51 forming the carriage 50 and includes the movable front gate board 52b that is positioned behind the passenger seat 32 is forwardly pivotable. The extended loading space S is formed with the seat portion 321 and the backrest portion 322 of the passenger seat 32 forwardly pivoted, and the movable front gate board 52b pivoted to be placed over the backrest portion 322. Thus, the extended loading space S can be formed with a simple operation and with the carriage 50 and the passenger seat 32 having relatively simple configurations. Thus, the long object that protrudes beyond the carriage 50 can be loaded in a substantially horizontal state.

The step portion 322b is formed on a back surface of the backrest portion 322. When the backrest portion 322 forwardly pivots to be in a horizontal state, the movable front gate board 52b forwardly pivoted fits in the step portion 322b, and the upper surface of the movable front gate board 52b and the back surface of the backrest portion 322 are flush with each other. Thus, the long object can be loaded in the substantially horizontal state to be stably loaded without shaking, on the back surface of the movable front gate board 52b of the carriage 50 and the back surface of the backrest portion. Thus, the long object can be loaded on the extended loading space S without needing to have the front portion of the long object lifted at the portion of the movable front gate board 52b and thus can be easily pushed in without requiring large force.

The auxiliary seat 33 is disposed between the driver seat 31 and the passenger seat 32. The auxiliary seat 33 has a shorter lateral width than the driver seat 31 and the passenger seat 32, and the auxiliary seat 33 and the passenger seat 32 are arranged side by side to form an integrated shape. Thus, when the long object is loaded with the extended loading space S formed, a space is ensured around the auxiliary seat 33 so that the long object does not make the driver on the driver seat 31 feel cramped and does not hinder the driving operability. In the normal state with no extended loading space S formed, the auxiliary seat 33 and the passenger seat 32 form an integrated seat, and thus a wide space can be used as the passenger seat 32 with no step formed and a favorable design can be achieved.

The grooves 323 extending in the front and rear direction are formed on the back surface of the backrest portion 322 of the passenger seat 32. Thus, when the log object is loaded on the extended loading space S, the front portion of the long object can be accommodated in the groove 323. Thus, the long object can be prevented from laterally moving and thus is less likely to be displaced or shaken during the driving.

Next, a configuration of the seat frame 40 is described.

Figure 9:
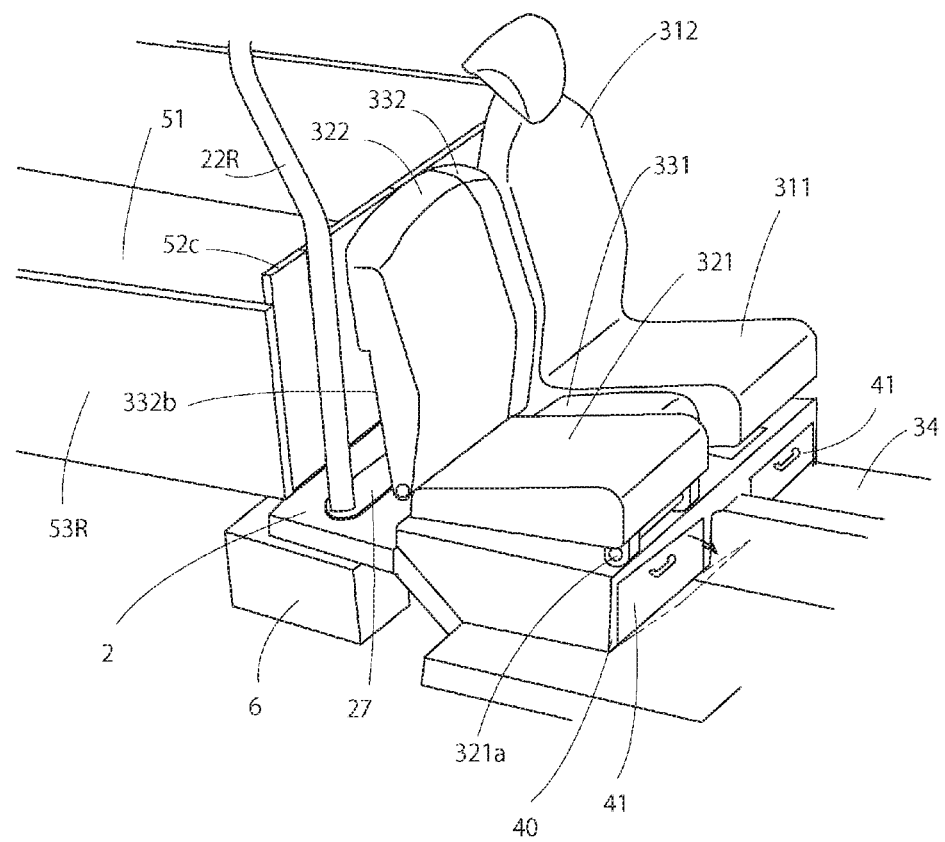
FIG. 9 is a front perspective view of the driving section.
Figure 14:
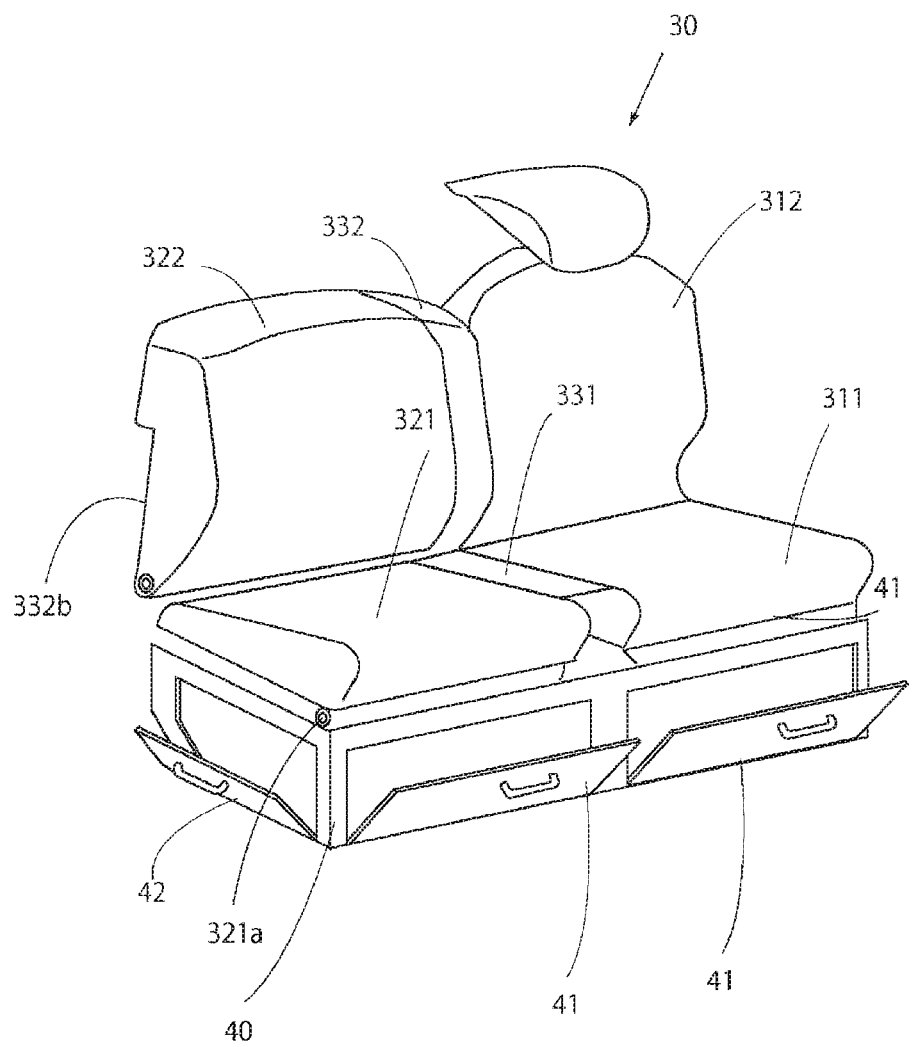
FIG. 14 is a perspective view illustrating a storage space below a seat in the driving section.

As illustrated in FIG. 9 and FIG. 14, the seat frame 40 has a box form so that a storage space T, extending in the left and right direction, is formed below the driver seat 31, the passenger seat 32, and the auxiliary seat 33. For example, the storage space T can accommodate items such as tools, a towel, a glove, a flashlight, and a work material. The storage space T has a front surface closed with covers 41 and 41. The covers 41 and 41 each have one of the upper portion and the lower portion pivotally supported and the other one of the portions provided with a handgrip and a lock portion, to be forwardly pivotable and thus can be opened and closed.

Figure 15:
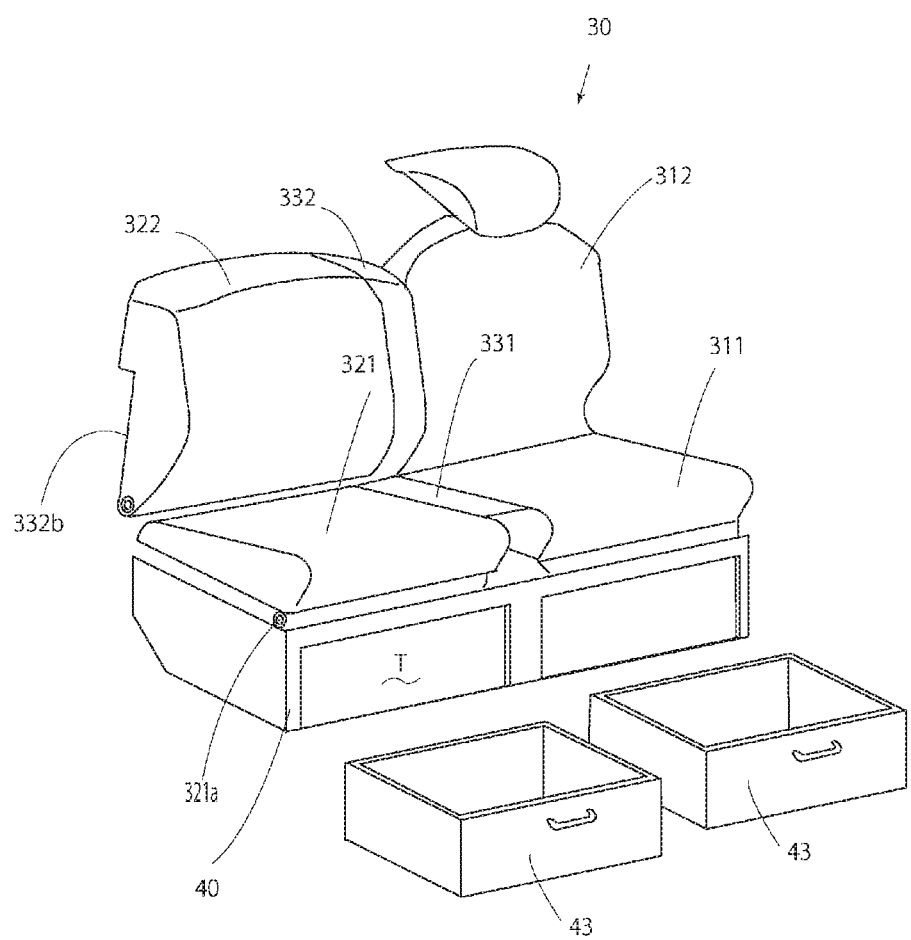
FIG. 15 is a perspective view illustrating an embodiment in which drawers are provided in the storage space.
Figure 16:
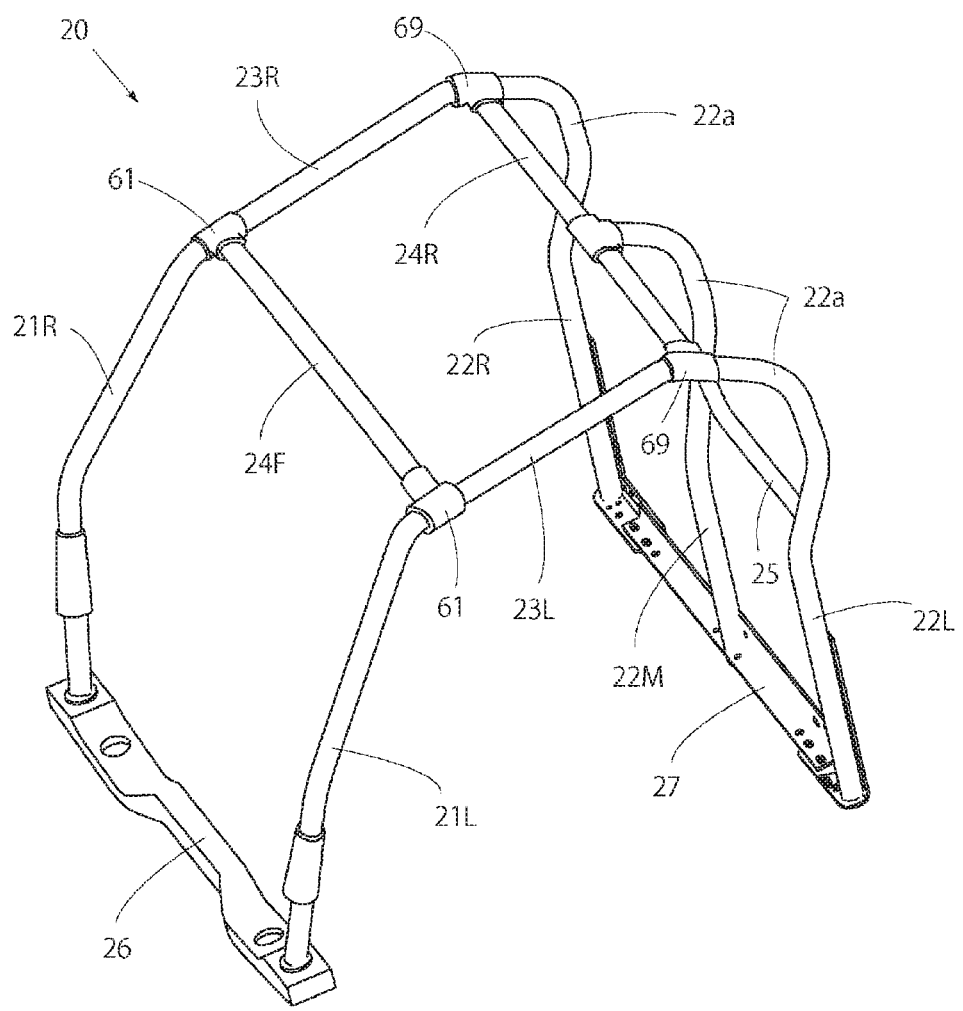
FIG. 16 is a perspective view of a ROPS frame.

The storage space T may be utilized with drawers 43 and 43 corresponding to the size of the storage space T as illustrated in FIG. 15, instead of providing the covers 41 and 41. Small articles can be accommodated in the drawers 43 and 43 to be easily put in and taken out from the space. Rails extending in the front and rear direction may be provided on the lower surface of the floor 34 or side portions or an upper portion of the seat frame 40, so that the drawers 43 and 43 can be easily pulled out and pushed in.

Furthermore, the upper side of the storage space T can be openable so that items can be put in and taken out from the space, with the seat portion 311 or the seat portion 321 pulled up through a pivoting action about the front lower portion or the rear lower portion of the seat portion 311 and/or the seat portion 321 of at least one of the driver seat 31 and the passenger seat 32.

As illustrated in FIG. 14, side covers 42 and 42 may be provided on both left and right sides of the storage space T, and the side cover 42 may have one of the front and rear portion (an upper portion and a lower portion) pivotally supported and the other one of the portions provided with a handgrip and a lock portion to be laterally openable and closable. In this configuration, a long luggage extending in the left and right direction can be accommodated in the storage space T, and can be put in and taken out from the space from both left and right sides. Furthermore, drawers pulled out toward both left and right sides may be employed.

As described above, the multipurpose vehicle 1 includes: the driving section 10; and the carriage 50 disposed behind the driving section 10. The engine 5, the transmission case 7, the fuel tank 6, and the battery 8 are disposed below the carriage 10. The seat 30 disposed in the driving section 10 at least includes the driver seat 31 and the passenger seat 32. The storage space T continuously extending in the left and right direction is disposed below the driver seat 31 and below the passenger seat 32. With the fuel tank 6, the battery 8, and the engine 5 disposed below the carriage 50, and not in the space below the driver seat 31 and the passenger seat 32, the storage space T with a large capacity can be ensured below the driver seat 31 and the passenger seat 32. The storage space T can be a large continuous space below the passenger seat 32 and below the driver seat 31. Thus, the storage space T can accommodate a laterally long object.

The storage space T can be opened by lifting the seat portion 311 and/or the seat portion 321 of at least one of the driver seat 31 and the passenger seat 32. Thus, items can be put in and taken out from the storage space T in a vertical direction and thus can be put in and taken out from the storage space T with a simple configuration, and without occupying a foot space as in the case of a drawer type storage box.

The storage space T can be opened by opening the cover 41 provided on the front end portion of the seat portion 311 and/or the seat portion 321 of at least one of the driver seat 31 and the passenger seat 32. Thus, items can be put in and taken out from the storage space T with a simple configuration and by a person sitting on the seat.

The storage space T can be opened by opening the side cover 42 provided on the side portion of the seat portion 311 and/or the seat portion 321 of at least one of the driver seat 31 and the passenger seat 32. Thus, items can be put in and taken out from the storage space T with a simple configuration. Furthermore, a laterally long object can be easily put in and taken out from the space.

The drawers 43 that can be pulled out forward are provided to the storage space T below the driver seat 31 and the passenger seat 32. Thus, items can be put in and taken out from the storage space by a person sitting on the seat and can be stored while being separated.

Next, a protection structure for the driving section 10 is described. As illustrated in FIG. 1 to FIG. 6 and FIG. 16, the driving section 10 can have a periphery and an upper side protected by the ROPS frame 20 and a roof 60. The ROPS frame 20 is formed by bending and welding strong (rigid) steel pipes, and includes: left and right front supporting columns 21L and 21R; left and right rear supporting columns 22L and 22R; a rear middle supporting column 22M; left and right upper frames 23L and 23R; front and rear lateral frames 24F and 24R; and a reinforcement frame 25.

The front supporting column 21L and 21R have lower ends standing on both sides of a front bearer frame 26 secured to the vehicle frame 2 in a rear portion of the hood 12, and are each bent to be in a dogleg shape in side view to diagonally extend rearward and upward.

Figure 2:
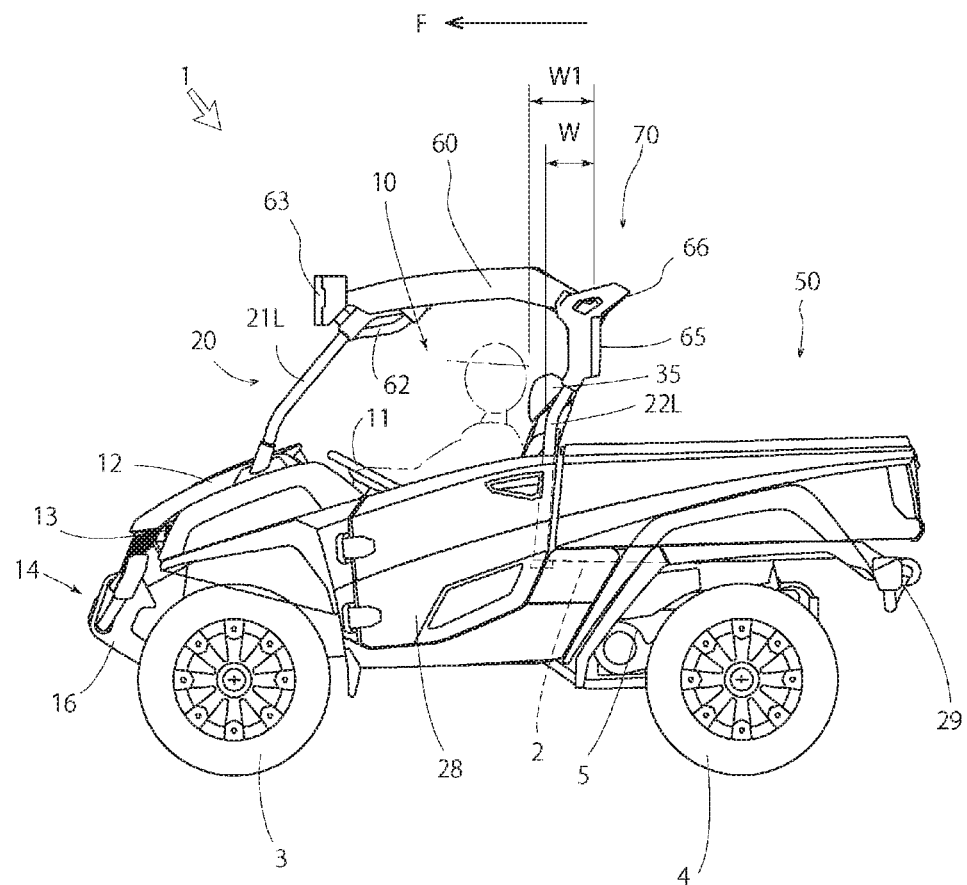
FIG. 2 is a side view of the entire multipurpose vehicle.

As illustrated in FIG. 2 and FIG. 9, the rear supporting columns 22L and 22R stand upward on both sides of a rear bearer frame 27 laterally extending on the vehicle frame 2 behind the seat 30. The rear middle supporting column 22M stands upward from the rear bearer frame 27 between the rear supporting column 22L and the rear supporting column 22R. More specifically, the rear middle supporting column 22M is disposed behind a position between the driver seat 31 and the auxiliary seat 33. The rear supporting columns 22L and 22R and the front supporting columns 21L and 21R have upper ends integrally coupled with rear ends of the upper frames 23L and 23R, and are formed by bending pipes.

Curved portions 22a, 22a, and 22a each having an upper portion bulging rearward in a recess form in side view are formed on the rear supporting columns 22L and 22R and the rear middle supporting column 22M. Thus, the rear supporting columns 22L and 22R and the rear middle supporting column 22M, extending substantially vertically upward from the rear bearer frame 27 on the rear lower side of the seat 30, are bent at portions close to upper end positions of the driver seat 31 and the passenger seat 32, that is, portions close to a shoulder position of the driver seated on the driver seat 31, to diagonally extend rearward and upward, and then are curved and bent to extend forward toward a portion above the seat 30. Thus, the curved portions 22a, 22a, and 22a are formed. As illustrated in FIG. 2, the curved portions 22a bulge rearward by a width W in the front and rear direction from the substantially vertical portions of the rear supporting columns 22L and 22R. The curved portions 22a, 22a, and 22a have upper ends coupled to rear portions of the upper frames 23L and 23R and the lateral frame 24R. The curved portions 22a are disposed to surround a rear upper portion in a range of a predetermined distance (W1) from the head of the driver seated on the driver seat 31 (the front end of the headrest 35). With this configuration, the rear supporting columns 22L and 22R do not interfere with a field of view on both sides. Thus, a large field of view can be ensured for the driver looking back. The curved portions 22a bulge rearward by an amount set in such a manner that the driver seated on the driver seat 31 can turn his or her head without coming into contact with the curved portions 22a. Thus, the driver can sharply turn his or her head without bumping on the columns.

The front lateral frame 24F couples front portions of the upper frames 23L and 23R to each other. The rear lateral frame 24R couples rear portions of the upper frames 23L and 23R to each other. The lateral frames 24F and 24R are detachably attached to the upper frames 23L and 23R. The front lateral frame 24F is detachably attached to front corner members 61 and 61. The rear lateral frame 24R is detachably attached to brackets 69 and 69. Alternatively, the bracket 69 may be integrated with a rear corner member 64. The rear middle supporting column 22M has an upper end coupled to an intermediate portion of the rear lateral frame 24R in the left and right direction. The reinforcement frame 25 couples intermediate portions of the left rear supporting column 22L and the rear middle supporting column 22M in the upper and lower direction to each other, and the headrest 35 is attached to the reinforcement frame 25. Thus, the front supporting columns 21L and 21R, the left and right rear supporting column 22L and 22R, the rear middle supporting column 22M, the left and right upper frames 23L and 23R, the front and rear lateral frames 24F and 24R, and the reinforcement frame 25 are coupled to each other to achieve a high rigidity, and thus the driver can be protected when the vehicle is overturned or when the other like accidents occur.

As described above, the multipurpose vehicle 1 includes: the driving section 10; the carriage 50 disposed behind the driving section 10; and the ROPS frame 20 disposed to surround the periphery of the driving section 10. The ROPS frame 20 includes: the left and right front supporting columns 21L and 21R; the left and right rear supporting columns 22L and 22R; the front supporting columns 21L and 21R; and the upper frames 23L and 23R coupling the upper portions of the rear supporting columns 22L and 22R to each other. The curved portion 22a bulging rearward is formed in the upper portion of the rear supporting column 22L disposed in an outer side portion behind the driver seat 31 provided in the driving section 10 at a position at the height of the head of the driver seated on the driver seat 31. Thus, the passenger can get on and off the driving section 10 without being hindered, luggage can be laterally loaded and unloaded on and from the carriage 50 without being hindered, and a larger space can be ensured around the head of the seated driver compared with a conventional configuration. Thus, the head of the driver is less likely to come into contact with the ROPS frame 20 even when the multipurpose vehicle 1 unintentionally tilts or bumps into something. Furthermore, a large field of view on the outer side and on the rear outer side of the vehicle body can be achieved without compromising the strength, and thus the driver can easily check both sides of the vehicle and check the rear side of the vehicle for backward driving.

The ROPS frame 20 includes the rear middle supporting column 22M provided on diagonally rearward side of the driver seat 31 between the left and right rear supporting columns 22L and 22R. The rear middle supporting column 22M has the upper end fixed to the lateral frame 24R coupling the left and right upper frames 23L and 23R to each other. The curved portion 22a bulging rearward is formed in the upper portion of the rear middle supporting column 22M and is disposed at a position at the height of the head of the driver seated on the driver seat. Thus, with the rear middle supporting column 22M further provided, the rigidity of the ROPS frame 20 disposed in the periphery of the driver can be increased. With the curved portion 22a, a larger field of view can be achieved for the rear view on the opposite side of the rear supporting column 22L in the left and right direction.

The reinforcement frame 25 is laterally disposed across the lower portion of the curved portion 22a formed on the rear supporting column 22L and the lower portion of the curved portion 22a formed on the rear middle supporting column 22M. Thus, the strength of the ROPS frame 20 in the periphery of the driver seat 31 can further be increased by the reinforcement frame 25 without hindering the rear view.

As illustrated in FIG. 2 to FIG. 5 and FIG. 7, the ROPS frame 20 includes the front corner members 61 and 61 disposed at coupling portions between the upper portions of the left and right front supporting columns 21L and 21R and the front portions of the upper frames 23L and 23R. A grip 62 and an upper working lamp 63 are integrally attached to the front corner member 61. The front corner member 61 has a dogleg shape in side view and the grip 62 bulges downward to couple lower portions at both ends of the front corner member 61 in the front and rear direction to each other. With the grip 62 thus provided, the driver can support him or herself by gripping the grip 62 when getting on the driver seat 31, or a fellow passenger seated on the passenger seat 32 can support him or herself by gripping the grip 62 when the vehicle travels on a rugged road or in the other like situations. The upper working lamp 63 protrudes forward from the front corner member 61 and forms a light source extending in the vertical direction. The light source of the upper working lamp 63 includes a plurality of LEDs arranged in the vertical direction. The light source is not limited to the LEDs. The upper working lamps 63 may be used as a turning signal and clearance lamps. The upper working lamp 63 and a rear working lamp 65 described later have the same shape, and thus can achieve an integrated design and do not unnecessarily increase the types of parts for the sake of cost reduction.

The rear corner members 64 and 64 are provided to coupling portions between the upper portions of the left and right rear supporting columns 22L and 22R and rear portions of the upper frames 23L and 23R. The rear working lamp 65 and a bracket 66 of a roof rack 70 are formed on the rear corner member 64. A bracket 67 of the roof rack 70 for reinforcement is provided at the same height portion as the bracket 66 in the upper portion of the rear middle supporting column 22M. The front supporting columns 21L and 21R, the left and right rear supporting columns 22L and 22R, and the left and right upper frames 23L and 23R may be formed of different members and coupled to each other by the front corner member 61 and the rear corner member 64 formed with rigid members. With this configuration, the parts can be commonly used among specifications with different vehicle body sizes.

The roof 60 is attached to the upper portions of the upper frames 23L and 23R and the lateral frames 24F and 24R, and serves as a protection from sun and rain. The roof 60 has an inner surface with four corners fixed with the front corner members 61 and the rear corner members 64 and 64.

Figure 17:
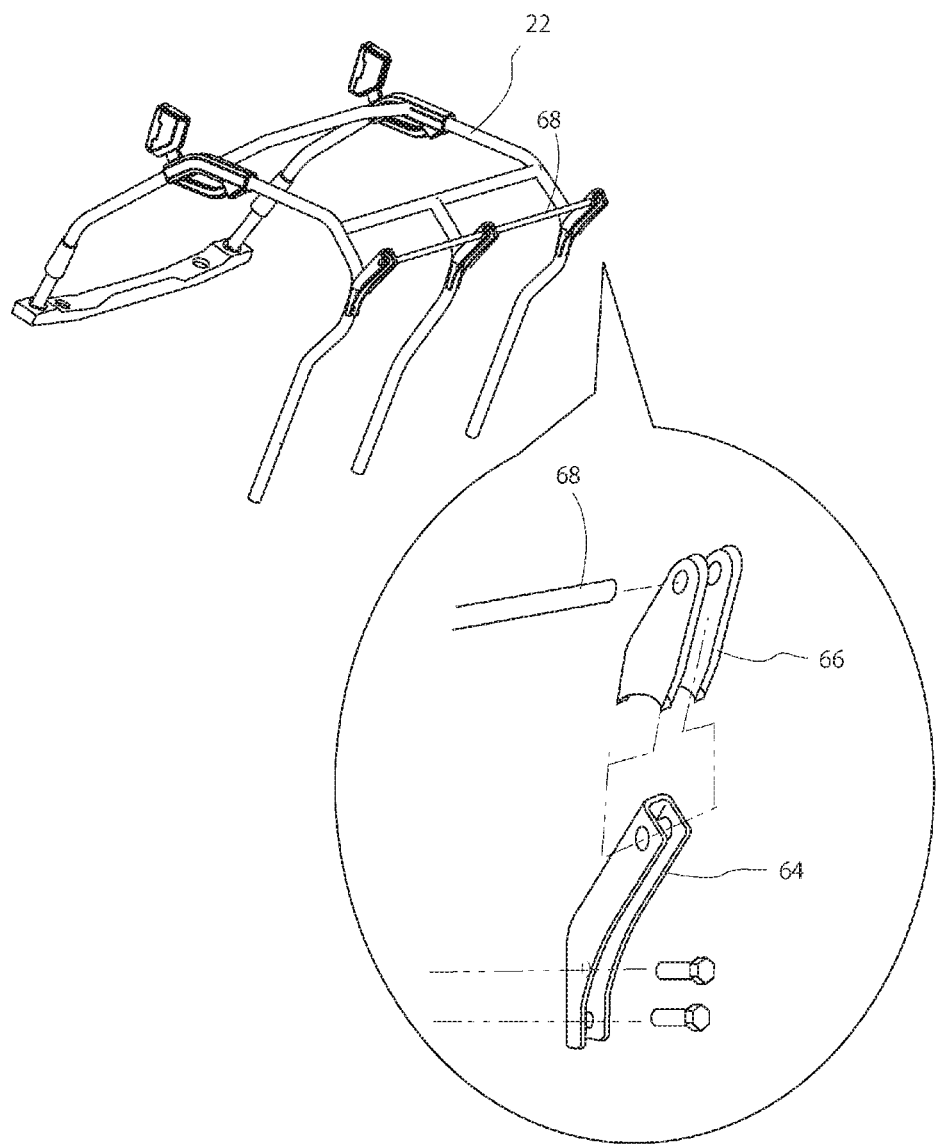
FIG. 17 is a perspective view illustrating an attaching portion of a roof rack.

Next, the roof rack 70 is described. The roof rack 70 includes the brackets 66 and 66 and 67 and a rack bar 68. In this embodiment, the bracket 66 is integrally formed with the rear corner member 64, and the rear working lamp 65 is integrally attached to the rear corner member 64 (or the bracket 66). The rear working lamp 65, extending in the vertical direction on the rear surface of the rear corner member 64 and disposed below the bracket 66 and within the width of the rear corner member 64, is disposed to emit light onto the carriage 50. The rear corner members 64 and 64 (or the brackets 66 and 66) are detachably secured onto the upper portion rear surfaces of the rear supporting columns 22L and 22R with screws. How the rear corner members 64 and 64 are attached to the rear supporting columns 22L and 22R is not limited. As illustrated in FIG. 17, the bracket 66 and the rear corner member 64 may be formed of different members, and the bracket 66 may be secured to the rear corner member 64 with screws with the rear corner member 64 secured to the rear supporting column 22 with screws.

Figure 18:
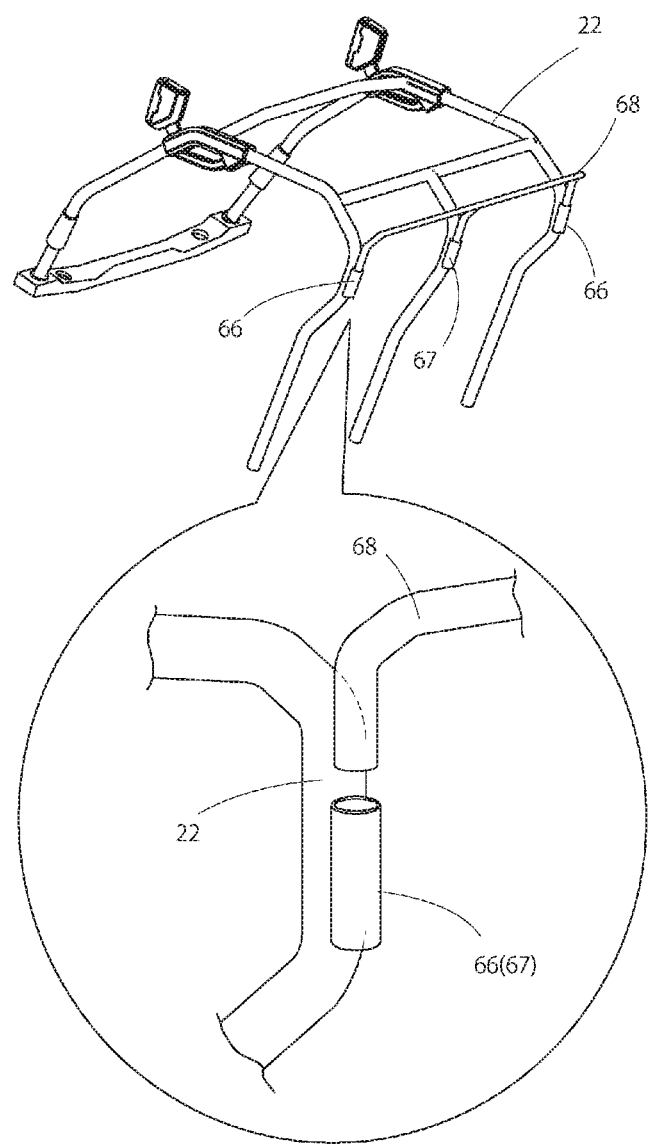
FIG. 18 is a perspective view illustrating another embodiment of the attaching portion of the roof rack.

The rack bar 68 is secured to the upper rear end portions of the brackets 66 and 67. Thus, the rack bar 68 extending in the left and right direction is disposed on a rear upper portion of the driving section 10. In this embodiment, the rack bar 68 is formed of a steel pipe, and is fixed by being inserted in fitting portions of the brackets 66 and 66 opened on the inner side in the left and right direction and in a through hole of the bracket 67 opened in the left and right direction. However, how the rack bar 68 is fixed to the bracket 66 is not limited. As illustrated in FIG. 18, the brackets 66 and 67 may be formed of pipes, and may be welded and fixed on the upper portion rear surfaces of the rear supporting columns 22L and 22R and the rear middle supporting column 22M with the axis extending in the vertical direction, and the rack bar 68 may be formed of a pipe thinner than the brackets 66 and 67 and have both ends bent downward to be inserted in the brackets 66 and 67. Thus, the roof rack 70 can be pulled upward, and thus can be attached and detached easily.

With the roof rack 70 having the configuration described above, the long object that overwhelms the entire length of the carriage 50 and thus cannot be loaded on the extended loading space S is loaded on the carriage while being secured with a rope or the like, with the rear end of the long object supported by the rear portion of the carriage 50 and the front lower portion of the long object placed on the rack bar 68 of the roof rack 70. In this configuration, the rack bar 68 is positioned more on the rear side than the rear end of the roof 60 and is positioned at a substantially the same height as the upper end of the roof 60. Thus, the long object can be tightly secured without contacting the roof 60.

Figure 19:
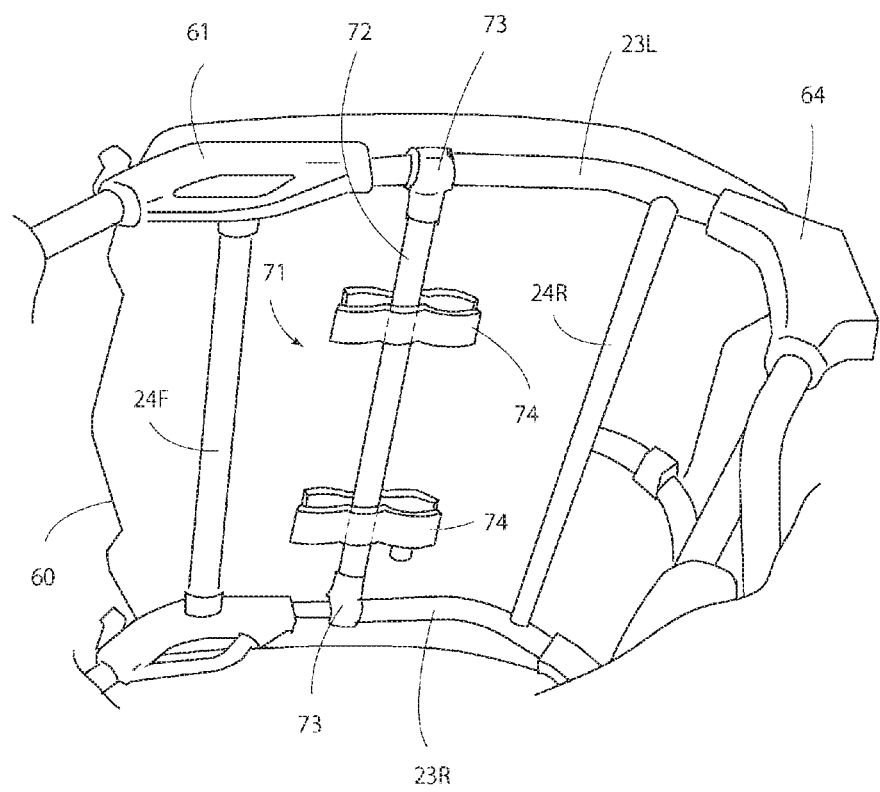
FIG. 19 is a perspective view illustrating an embodiment with the roof rack disposed below a roof.

A roof rack 71 may be provided on the inner side of the roof 60. More specifically, as illustrated in FIG. 19, the roof rack 71 has brackets 73 and 73 provided on both sides of a rack bar 72, and attached to the upper frames 23L and 23R. In this embodiment, the brackets 73 and 73 each include upper and lower half portions, and the upper frames 23L and 23R are sandwiched by these portions and are secured with screws. Holders 74 and 74 are secured to the rack bar 72, so that items that should not be wet, that should be easily taken out immediately, and that should not be seen from the outside, or the like can be stored or accommodated in the holders 74 and 74. Alternatively, the brackets 73 and 73 of the roof rack 71 may be secured to the lateral frames 24F and 24R, and the rack bar 72 may be disposed to extend in the front and rear direction. How the brackets 73 and 73 are attached to the upper frames 23L and 23R or the lateral frames 24F and 24R is not limited and may be directly secured with screws. The structure of the holder 74 and how the holder 74 is attached to the rack bar 72 are not limited. A plurality of the roof racks 71 may be arranged in the front and rear direction or in the left and right direction, so that the number of items that can be held can be increased and the strength can be increased.

As described above, the multipurpose vehicle 1 includes: the driving section 10; the carriage 50 disposed behind the driving section 10; and the ROPS frame 20 disposed to surround the periphery of the driving section 10. The ROPS frame 20 at least includes the left and right rear supporting columns 23L and 23R standing on both left and right sides behind the driving section 10. The roof rack 70 has both left and right sides secured to the upper portions of the left and right rear supporting columns 23L and 23R. Thus, the roof rack 70 is attached on the rear portion of the ROPS frame 20, so that the long object can be fixed with the rear end portion supported by the rear gate board 54 of the carriage and the front portion placed on the roof rack 70. Thus, the long object can be placed without protruding beyond the rear end of the vehicle body and without falling off. The roof 60 can be prevented from being damaged because the front portion of the long object is placed on the roof rack 70. The long object can be loaded at a position away from the driver seat 31 even in a configuration without the roof 60.

The roof rack 70 includes the pair of left and right brackets 66 and 66 secured to the upper portions of the left and right rear supporting columns 22L and 22R; and the rack bar 68 having both ends secured to the pair of left and right brackets 66 and 66. The rear working lamps 65 and 65 as lighting devices are attached to the left and right brackets 66 and 66. Thus, the rear working lamps 65 and 65 can fully illuminate the carriage 50, so that an unloading operation can be safely performed at night.

The bracket 66 of the roof rack 70 is detachably attached to the ROPS frame 20. Thus, the roof rack 70 can be easily attached and detached, and thus can be detached when not required to achieve a simple outer appearance.

INDUSTRIAL APPLICABILITY

The present invention can be applied to a farming vehicle, a construction vehicle, a recreational vehicle, or the like including: a driving section including a driver seat and a passenger seat arranged side by side in a left and right direction; and a carriage disposed behind the driving section.

REFERENCE SIGNS LIST 1 multipurpose vehicle
10 driving section
50 carriage
31 driver seat
32 passenger seat
321 seat portion
322 backrest portion
51 floor board
52 front gate board
52b movable front gate board
S extended loading space

The invention claimed is:

1. A multipurpose vehicle comprising:
a driving section; and
a carriage disposed behind the driving section,
wherein the driving section includes:
a driver seat; and
a passenger seat disposed side by side with the driver seat,
wherein the passenger seat includes a seat portion and a backrest portion,
wherein the seat portion is forwardly pivotable about a front lower portion,
wherein the backrest portion is forwardly pivotable about a lower portion,
wherein a front gate board stands on a front end of a floor board forming the carriage and includes a movable front gate board that is positioned behind the passenger seat and is forwardly pivotable,
wherein an extended loading space is formed with the seat portion and the backrest portion of the passenger seat pivoted forward and the movable front gate board pivoted to be placed over the backrest portion,
wherein a step portion is formed on a back surface of the backrest portion,
wherein when the backrest portion forwardly pivots to be in a horizontal state, and an upper surface of the movable front gate board and the back surface of the backrest portion are flush with each other, and
wherein a lock mechanism that is able to maintain a horizontal direction position and a vertical direction position is provided near the backrest portion.

2. The multipurpose vehicle according to claim 1,
wherein rear corner members are provided in upper portions of left and right rear supporting columns and a rear middle supporting column standing upward from a rear bearing frame laterally disposed on a vehicle frame behind the driver seat and the passenger seat, and
wherein a roof rack including a bracket and a rack bar is attached to the corner members.

3. The multipurpose vehicle according to claim 2, wherein a ROPS frame includes:
the left and right rear supporting columns and the rear middle supporting column;
left and right front supporting columns;
left and right upper frames;
front and rear lateral frames; and
a reinforcement frame,
wherein curved portions bulging rearward are formed in upper portions of the rear supporting columns and the rear middle supporting column, and
wherein the curved portions surround a periphery of a rear upper portion of a head of a driver seated on the driver seat while being separated from the head by a predetermined distance.

4. The multipurpose vehicle according to claim 2, wherein rear working lamps are provided to the corner members.

5. The multipurpose vehicle according to claim 2, wherein a rack bar is inserted to be secured in a fitting portion opened in the bracket.

6. A multipurpose vehicle comprising:
a driving section; and
a carriage disposed behind the driving section,
wherein the driving section includes:
a driver seat; and
a passenger seat disposed side by side with the driver seat,
wherein the passenger seat includes a seat portion and a backrest portion,
wherein the seat portion is forwardly pivotable about a front lower portion,
wherein the backrest portion is forwardly pivotable about a lower portion,
wherein a front gate board stands on a front end of a floor board forming the carriage and includes a movable front gate board that is positioned behind the passenger seat and is forwardly pivotable,
wherein an extended loading space is formed with the seat portion and the backrest portion of the passenger seat pivoted forward and the movable front gate board pivoted to be placed over the backrest portion,
wherein a step portion is formed on a back surface of the backrest portion,
wherein when the backrest portion forwardly pivots to be in a horizontal state, an upper surface of the movable front gate board and the back surface of the backrest portion are flush with each other,
wherein protruded portions extending in a front and rear direction are formed on the back surface of the backrest portion and the movable front gate board, and
wherein the protruded portions are provided with handgrips.

7. The multipurpose vehicle according to claim 1,
wherein a storage space continuously extending in a left and right direction is disposed below the driver seat and below the passenger seat,
wherein the storage space is able to be opened by lifting a seat portion of at least one of the driver seat and the passenger seat, and
wherein the storage space is able to be opened by opening a side cover provided to a side portion of a seat portion of at least one of the driver seat and the passenger seat.

* * * * *